(12) United States Patent
Schultz et al.

(10) Patent No.: US 10,209,680 B2
(45) Date of Patent: Feb. 19, 2019

(54) REMOTE CONTROL AND REMOTE CONTROL SYSTEMS

(75) Inventors: John Schultz, Mawson Lakes (AU); Chris Wood, Mawson Lakes (AU)

(73) Assignee: XPED HOLDINGS PTY LTD, Mawson Lakes, S.A. (AU)

( * ) Notice: Subject to any disclaimer, the term of this patent is extended or adjusted under 35 U.S.C. 154(b) by 21 days.

(21) Appl. No.: 13/824,342

(22) PCT Filed: Sep. 26, 2011

(86) PCT No.: PCT/AU2011/001235
§ 371 (c)(1),
(2), (4) Date: Mar. 15, 2013

(87) PCT Pub. No.: WO2012/037618
PCT Pub. Date: Mar. 29, 2012

(65) Prior Publication Data
US 2013/0176106 A1    Jul. 11, 2013

(30) Foreign Application Priority Data
Sep. 24, 2010 (AU) .................. 2010904335

(51) Int. Cl.
G06K 7/10 (2006.01)
G05B 1/01 (2006.01)
G08C 17/02 (2006.01)

(52) U.S. Cl.
CPC .............. *G05B 1/01* (2013.01); *G08C 17/02* (2013.01); *G08C 2201/20* (2013.01); *G08C 2201/61* (2013.01)

(58) Field of Classification Search
CPC . G07C 9/00158; G08C 17/02; G08C 2201/61
(Continued)

(56) References Cited

U.S. PATENT DOCUMENTS 6,359,661 B1   3/2002   Nickum
6,369,693 B1   4/2002   Gibson
(Continued)

FOREIGN PATENT DOCUMENTS

EP   1 282 083 A3   9/2005
JP   4-117826 A     4/1992
(Continued)

OTHER PUBLICATIONS

Australian Office Action for Australian Application No. 2011305067 dated Aug. 15, 2014.
(Continued)

*Primary Examiner* — Vernal U Brown
(74) *Attorney, Agent, or Firm* — Birch, Stewart, Kolasch & Birch, LLP

(57) ABSTRACT

A controller device for controlling multiple devices, where a controller and device are brought into near field communication distance of one another, the proximity of which is such that the controller and device communicate and initiate processes that establish control mechanisms between at least the controller and the respective device, wherein the controller and device each include: a processor for processing digital data; a digital data memory a portion of the memory including digital data usable by the processor to restrict access of the controller to none, one or more devices.

17 Claims, 8 Drawing Sheets

(58) Field of Classification Search
USPC .............................................. 340/5.52, 12.22
See application file for complete search history.

(56) References Cited

U.S. PATENT DOCUMENTS

| | | | |
|---|---|---|---|
| 6,791,467 B1 | 9/2004 | Ben-Ze'ev | |
| 7,035,281 B1 | 4/2006 | Spearman et al. | |
| 7,136,709 B2* | 11/2006 | Arling et al. | .................. 700/65 |
| 7,586,398 B2 | 9/2009 | Huang et al. | |
| 7,957,528 B2 | 6/2011 | Iwamura | |
| 7,986,917 B2 | 7/2011 | Ahlgren et al. | |
| 7,996,669 B2 | 8/2011 | Pearson et al. | |
| 7,996,869 B2 | 8/2011 | Tu et al. | |
| 8,437,477 B2 | 5/2013 | Koike | |
| 8,558,676 B2 | 10/2013 | Hayes et al. | |
| 9,412,261 B2 | 8/2016 | Huang et al. | |
| 2003/0172283 A1 | 9/2003 | O'Hara | |
| 2004/0070491 A1 | 4/2004 | Huang et al. | |
| 2005/0074147 A1 | 4/2005 | Smith et al. | |
| 2005/0125664 A1* | 6/2005 | Berkema | ............... H04L 63/061 713/168 |
| 2006/0085635 A1* | 4/2006 | Park | ............... 713/159 |
| 2006/0250213 A1* | 11/2006 | Cain et al. | ............... 340/5.52 |
| 2007/0018844 A1* | 1/2007 | Sutardja | ............... 340/825.69 |
| 2007/0138302 A1* | 6/2007 | Antoniou | ............... H04L 41/00 235/492 |
| 2008/0134237 A1 | 6/2008 | Tu et al. | |
| 2008/0288618 A1* | 11/2008 | Vardi | ............... H04L 67/2823 709/223 |
| 2009/0128392 A1* | 5/2009 | Hardacker et al. | ............... 341/175 |
| 2009/0282130 A1* | 11/2009 | Antoniou | ............ H04L 41/0886 709/220 |
| 2010/0081375 A1 | 4/2010 | Rosenblatt et al. | |
| 2010/0099396 A1* | 4/2010 | Huq et al. | ............... 455/420 |
| 2011/0121943 A1* | 5/2011 | Morovitz | ............... G06F 21/32 340/5.82 |
| 2011/0302619 A1* | 12/2011 | Hale et al. | ............... 725/110 |

FOREIGN PATENT DOCUMENTS

| | | |
|---|---|---|
| JP | 2001-506069 A | 5/2001 |
| JP | 2002-112356 A | 4/2002 |
| JP | 2003-307505 A | 10/2003 |
| JP | 2003-338814 A | 11/2003 |
| WO | WO-01/71685 A1 | 9/2001 |

OTHER PUBLICATIONS

Chilean Examination Report for Application No. 794-13 dated May 5, 2015 with English translation.
Extended European Search Report dated Dec. 20, 2013 for Application No. 11826229.4.
International Preliminary Report on Patentability for International Application No. PCT/AU2011/001235 dated Mar. 26, 2013.
Mexican Office Action No. 40948 for Application No. MX/a/2013/003253 dated May 28, 2013.
Mexican Office Action No. 69011 for Application No. MX/a/2013/003253 dated Sep. 2, 2014.
Singapore Examination Report for Application No. 2013019351 dated Feb. 5, 2015.
Singapore Written Opinion for Application No. 2013019351 dated Jun. 23, 2014.
International Search Report, dated Dec. 22, 2011, for International Application No. PCT/AU2011/001235.

* cited by examiner

Initial State

Transitional State

Final State

REMOTE CONTROL AND REMOTE CONTROL SYSTEMS

This application is the National Phase Under 35 U.S.C. § 371 of PCT International Application No. PCT/AU2011/001235, which has an International filing date of Sep. 26, 2011, and which claims priority Under 35 U.S.C. § 119 to Australian Application No. 2010904335, filed on Sep. 24, 2010.

FIELD OF INVENTION

The present invention relates to the field of remote controls and devices including remotely operated devices as well as devices which provide information but which are not controllable, and more particularly to managing the communications between one or more controllers and one or more devices.

BACKGROUND OF THE INVENTION

This patent application should be read in conjunction with patent PCT/AU2010/000358 "An arrangement for managing wireless communication between devices", and patent PCT/AU2010/000938 "Remote control arrangement", and PCT/AU2009/01711 "An arrangement for managing mobile device access to precinct regions containing services and products and information", all of which are assigned to the assignee of the invention the subject of this application, and all of which are incorporated by reference into this specification, to assist the reader to understand one or more elements and features described herein that are not described in detail.

The success of the various forms of the modern remote control, have lead to a situation where they have become ubiquitous. So much so that the usefulness they provide is diminishing and is doing so at an increasing rate since our homes and places of work are bursting at the seams with a plethora of "controllable" devices including but not limited to audio-visual equipment, air conditioners, central heating systems, blinds and curtains, cars (door locks and anti-theft), garage doors and so the list goes on, each one requiring a remote control and then some devices such as temperature gauges, rain sensors, pressure gauges, etc that are not controllable but which provide information that may assist the user of a remote control to better control their surroundings.

According to research done by the Consumer Electronics Association (CEA), the average American home contains up to 6 remote controls (typically for controlling the Television (TV), Video Cassette Recorder (VCR), Digital Versatile Disc (DVD), 5.1 Receiver (sound processor and switch), Set Top Box (STB), Personal Video Recorder (PVR)) and this does not include those for the air conditioner (AC), garage, and cars and adding these leads perhaps 10+ remote controls that we use from day to day. Clearly the situation is "out of control". This situation is not going to improve as we enter the age of Smart Energy and more generally Smart Resource usage. In this "smart future" a whole new category of controllable devices and information providing devices will become part of our day-to-day lives helping each of us to do our bit to minimize our use of the non-renewable resources of the planet.

In the future it is likely we will be surrounded by an infrastructure with which we can interact in a manner personal to each of us. However, will we need more controllers and remote controls or other human/infrastructure interface devices to control devices/appliances and extract information from them?

The invention described herein addresses at least some of the abovementioned issues and provides advances to the current state of the art or at least an alternative, by providing one or more of a number of solutions to the associated issues, which include; how controllers (remote control device useable by a human) communicate with and manage controllable devices/appliances and receive information from devices/appliances; how multiple controllers can be managed; implementing access controls for multiple controllers and multiple users; methods for establishing and managing wireless networks (at least one wireless communication link between two or more devices where one of the devices could be a controller); various other means for simplifying the process of user and device/appliance interaction; and providing a mechanism for physically expanding the functionality of a controller.

BRIEF SUMMARY OF THE INVENTION

In a broad aspect of the invention is a controller device for controlling multiple devices, where a controller and device are brought into near field communication distance of one another, the proximity of which is such that the controller and device communicate and initiate processes that establish communications between at least the controller and the respective device, wherein the controller and device each includes, a processor for processing digital data, a digital data memory a portion of the memory including digital data usable by the processor to restrict access of the controller to none, one or more devices.

In an aspect of the invention a user interface operable by a user of the controller device to input data, further includes a portion of the digital data memory including data usable by the processor of the controller device to determine from user input data whether there is a match of the user input data with predetermined data within the memory, and where there is a match to allow the user to use the controller in a predetermined manner.

The controller device further includes a portion of the memory including data usable by the processor of the controller device wherein if the controller device does not have a match for the user input data the controller allows a user of the device to use the controller device as a default user in a predetermined manner.

The controller device includes predetermined restrictions stored in the digital data memory to restrict access of the controller to the function of none, one or more functions of accessible devices.

The controller device includes predetermined restrictions stored in the digital data memory that are applied during predetermined periods.

The controller device includes a biometric device usable by a user to derive data unique to a user of the biometric device and make that data available within the controller device and includes a portion of the memory including data usable by the processor of the controller device to determine from data made available from the biometric device whether there is a match of the data made available from the biometric device with predetermined data within the memory, and where there is a match to allow the user to use the controller in a predetermined manner of operation.

The controller device includes portions of the memory including data usable by the processor of the controller device to determine whether more than one user is able to use the controller device according to predetermined manners of operation.

A controller device includes portions of the memory including data usable by the processor of the controller device to determine whether the user provides input to match a challenge presented to the user before allowing a change to the predetermined manner of operation.

The controller device wherein the controller and device each includes a pre-shared digital keys or each have a digital certificate to verify their identity one to the other during communication or to permit coded communication between the controller and device.

The controller device wherein all the controller and accessible devices that have communication networks created by the pairing of controller/s with device/s have the same key or digital certificate or alternatively each may have an individual key or digital certificate.

The controller device wherein each device has a key or certificate lifecycle.

The controller device wherein one or more devices is one of the group of; light switches, power sockets/outlets/sources, signs/billboards/information boards.

In another aspect of the invention a network arrangement between one or more controller devices and one or more devices, the network arrangement includes each controller device and device including at least two communication mechanisms one being a near field communication mechanism and the other being other than near field wireless communication mechanism, and wherein controller and devices are associated with each other by a bringing together or one to the other in close near field communication proximity, such that sufficient information is exchanged to create at least one network having at least one controller device and one device between which a communication network using other than the near field communication mechanism is created, wherein a key is exchanged between the two types of devices during the near field communication proximity exchange of data.

In an aspect of the invention the network arrangement is such that one or more controller devices and one or more devices can be grouped such that a respective controller device controls the predetermined one or more controllable devices in one group.

The network arrangement wherein the respective control device controls another predetermined one or more devices in one or more further groups.

The network arrangement wherein one or more appliance devices are one or more of the group of light switches, power sockets/outlets/sources, signs/billboards/information boards.

The network arrangement wherein one or more controller devices are adapted to indicate on the controller device three or more states of operation of one or more devices. The states include an on state, and off state, and a transition between the prior two states and a non-controllable state.

The network arrangement further includes at least one device in a set of multiple devices within in the network having a digital data memory a portion of the memory including digital data representative of a copy of one or more keys and/or certificates to act as a backup storage device.

The network arrangement further includes each device having a network address in at least one network, wherein the digital data memory of the back up storage device includes digital data representative of a pairing table including at least a device identification and the device network address of each device in the network.

The network arrangement wherein the network arrangement includes a controller and device brought into near field communication distance of one another such that the controller and device communicate to exchange the key and pairing table and permissions.

The network arrangement wherein the device having the back-up key storage function is be pre-programmed to release keys, pairing table/s and other data stored in the device, only under predetermined conditions.

The network arrangement includes each device including at least one communication mechanisms being a near field communication mechanism, and wherein devices are associated with each other by a mutual bringing together of one to the other in close near field communication proximity, such that sufficient information is exchanged to create at least one network wherein a key is exchanged between the two types of devices during the near field communication proximity exchange of data.

The network arrangement wherein a controller commands the device and the device acknowledges to the commanding controller that the command has been received and subsequently sends a state update to all controllers to indicate the new state has been achieved.

The network arrangement wherein one or more devices is one of the group of; light switches, power sockets/outlets/sources, signs/billboards/information boards.

It should be appreciated that the present invention can be implemented in numerous ways, including as a process, an apparatus, a system, or a computer readable medium such as a computer readable storage medium or a computer network wherein program instructions are sent over wireless, optical or electronic communication links. It should be noted that the order of the steps of disclosed processes may be altered within the scope of the invention.

Details concerning computers, computer networking, software programming, telecommunications and the like may at times not be specifically illustrated as such were not considered necessary to obtain a complete understanding nor to limit a person skilled in the art in performing the invention, are considered present nevertheless as such are considered to be within the skills of persons of ordinary skill in the art.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any background or prior art in this specification is not, and should not be taken as, an acknowledgment or any form of suggestion that such background or prior art forms part of the common general knowledge.

A detailed description of one or more preferred embodiments of the invention is provided along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications, and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF DRAWINGS

An illustrative embodiment of the present invention will be discussed with reference to the accompanying drawing wherein.

DETAILED DESCRIPTION OF EMBODIMENTS

Figure 1:
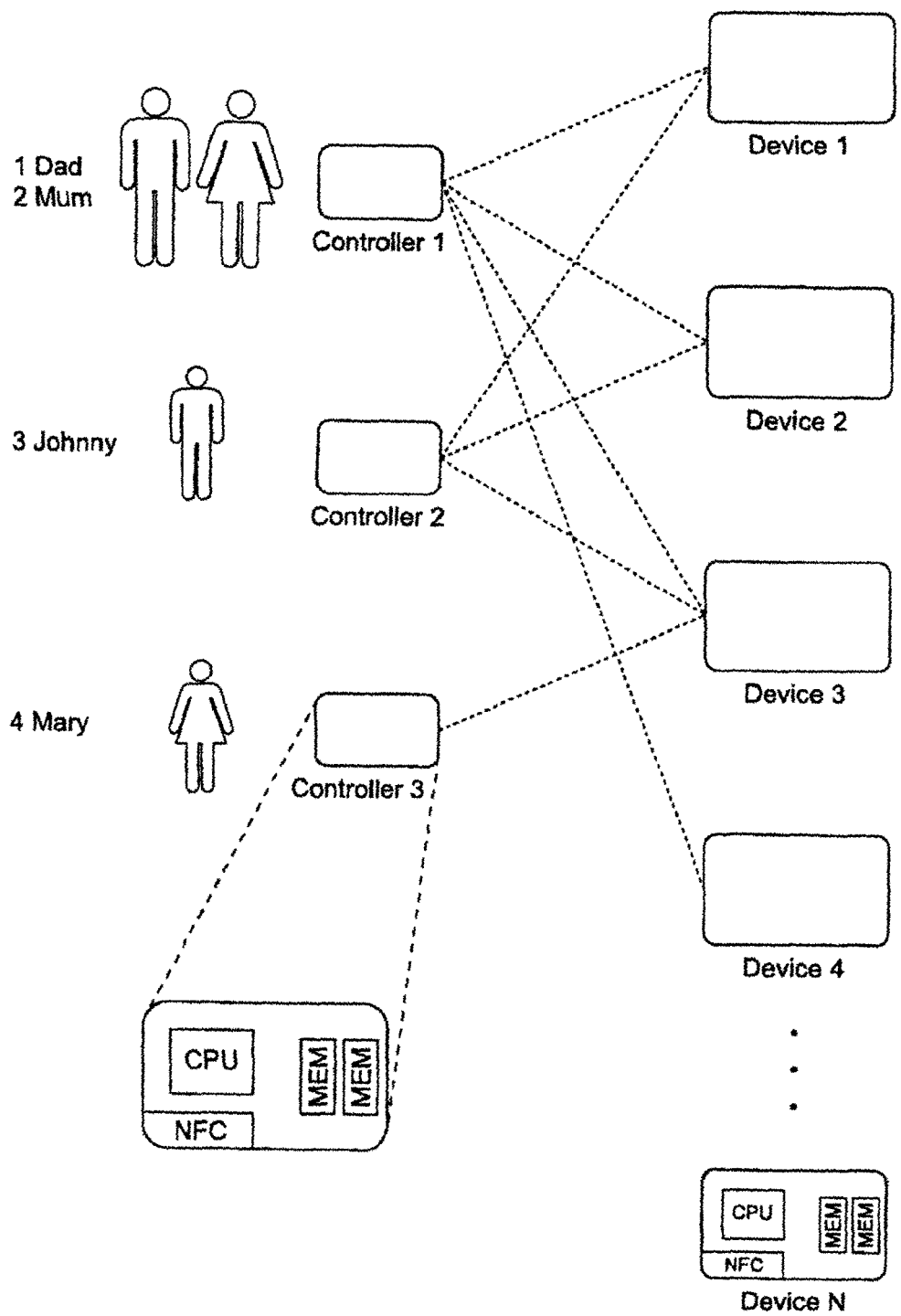
FIG. 1 represents a system comprising of several users, controllers and devices.

Apparatus and methods that allow an arrangement of several controllers, controllable devices or devices to interact are disclosed herein. The term appliance or appliances is used herein and is interchangeable with the term controllable device and device which is not controllable but which can provide information, as is referred to in the documents incorporated by reference.

In this description a controller has the ability to control, monitor or otherwise interact with other devices. These devices may be controllable devices, in which case their state can be affected by a controller. Additionally a device may also be a device that cannot have its state affected by a controller, but may form an arrangement where the controller can simply monitor the state of, or otherwise retrieve information or data from the device. A controller or device may be a physical hardware device or may be representative of a software client running on a device containing a processor and memory.

A controller device can be used for controlling multiple devices. The manner in which a controller can become the controller of a device which may otherwise not be controllable remotely relies on the controller and device being brought into near field communication distance of one another where each has a near field communications capability. The proximity of the controller and device is such that the controller and device communicate using a near field communication protocol and initiate processes that establish control mechanisms between at least the controller and the respective device the communications using the near field capability or another common communication capability of the controller and device, wherein the controller and device each include, a processor for processing digital data and a digital data memory. The details of the near field and other communication hardware and software is provided in the patent specifications incorporated by reference but the hardware is pictorially represented in one of each a controller and device in FIG. 1, including a central processing unit (CPU), memory (MEM) in the form of two modules, and the near field module (NFC). A portion of the memory includes digital data usable by the processor to restrict access of the controller to none, one or more devices.

The controllers, Wireless Networks, Personal Area Networks (PANs), and appliances described herein, will contain software and hardware but no one of these will make up those devices or mechanisms, since it is possible to provide the required and described functionality using the most suitable of either of both software and hardware including in particular digital data memory for storing digital data pre-stored or stored therein after receipt thereof via the one or more communication exchanges between devices or controller and device. It is possible for a device, once incorporated into a group, as will be described in greater detail later in the specification, to be provided digital data which loads the memory or a portion of the memory for the first time, or which is an update of digital data previously included, say at the time of initial setup into the device.

Access Controls:

In a multi-controller environment, it will be advantageous to restrict access to some services or functionality on selected controllers. These restrictions can be associated with a particular controller, device, appliance, service, or user by implementing a system of access controls.

Examples of the use of access controls can include where a child using a controller should be restricted to accessing the Internet within a predetermined time period or after a predetermined time, or be denied access to the ability to remotely open the garage door. The adult user/s can determine those times or period. This could be achieved through applying access control restrictions to a user's controller in the case where personal controllers are used. That is, a controller is primarily or exclusively used by a single user or a multi-user controller potentially has different restrictions for different users.

In the case where multiple users have access to one or more controllers, the access controls need to be allocated to the individual user at the time it is being used by that user, rather than allocated solely to the controller. This can be enforced if the identity of the user can be determined. This may be possible through the use of a user entered Personal Identity Number (PIN) or a biometric recognition method, such as a visual camera means, fingerprint scan, voice recognition, or some other user identity mechanism which in turn has control over the use of the controller.

In one embodiment, a biometric device is usable by a user to derive data unique to a user of the biometric device and make that data available within the controller device. In one approach to this requirement a portion of a memory within the controller or device, includes data usable by the processor of the controller device to determine from data made available from the biometric device whether there is a match of the data made available from the biometric device with predetermined data within the memory, and where there is a match to allow the user to use the controller in a predetermined manner. It is not the critical to the invention how the match is determined, however, there are many ways known to those skilled in the art to make the determination possible. In one example, when the data derived from the bio-metric means is not an exact match, the data is still capable of being determined to be a match for the purposes at hand. That is that there will be one or more characteristics of the data being compared that will fall within an acceptable degree of variance such that there is an acceptable surety that the user is in fact an allowable user of the controller and its functionality. To enter the data against which a comparison is to be made in the future a user setup procedure is required the processes of achieving that being many and varied and well known to those in the art. In one embodiment, the controller has a setup mode which can only be entered by using a factory set access code, ideally only available to the parent (in the home controller environment). Once the setup mode is active, there will be multiple procedures through which the authorized user can enter data, such as a secret Personal Identification Number (PIN) or bio-metric data suitable for the bio-metric device associated with the controller.

In addition to the above approach or as an alternative it is possible to require physical possession of the remote controller and during a set-up procedure or to effect a change to the set-up or functions (including assigning or changing access controls) associated with that controller, it is necessary to touch/tap/bring the remote controller into near field proximity (near field meaning it only operates over the distance of a few centimeters (associated with a known Near Field Communication (NFC) apparatus and communication method) with a device, controllable device or other controllable device within a predetermined time to verify a step in the process.

A number of preferred methods of assigning access controls are outlined with a series of figures and associated descriptions in the following paragraphs and associated figures.

FIG. 1 depicts how access controls could be organized between a number of controllers and devices controllable and non-controllable but referred to herein in the main simply as devices:

1.1 Access by controllers to devices can be secured by requiring both the controller and device to have pre-shared digital keys in order to encrypt communications between one another and optionally each to have a digital certificate in order to verify one to the other during communication their identity or to permit coded communication between the controller and device (corresponding decryption is also available by way of the possession of the relevant key, which may be one of many types known to those skilled in the art, e.g. symmetric, asymmetric, public, secret, etc;

1.2 All the devices on the same wireless networks created by the pairing of controller/s with device/s such as a PAN may have the same key or alternatively each may have an individual key;

1.3 Each device has a key lifecycle. In one arrangement out of the box a device has no key. The first controller to pair with the device will optionally set a key if required. The controller will choose the key and communicate it to the device over, in one preferred arrangement, a wireless near field communication link (near field meaning it only operates over the distance of a few centimeters) during the time it takes to bump/touch/or bring into close proximity the controller and the device. The controller may confer this key to other controllers as required. Controllers that can communicate with a device may change its own key as required. The ability for a controller to change a key may be restricted by user level access controls. If all controllers that can communicate with a device are lost/damaged then the device can be set back to its factory default state by for example, the user depressing a physical button on it, thus allowing a new key to be set by a new controller, or one of many other ways, by way of example, by entry into the controller of a reset key code or administrative operational state code or the like.

In another embodiment of an aspect of the invention, at least one device in the set of multiple devices within the network having a digital data memory a portion of the memory including digital data representative of the a copy of one or more keys to act as a key backup storage device, in addition to its typical function or a device dedicated to this important function. Thus as the multiple controllers and devices become activated for operation with other controllers and devices the at least one device, which has a key backup storage function, receives/collects the various keys, in for example a non-volatile memory in the form of a look-up-table (LUT) each time a controller is brought within NFC communication distance. In addition to key storage, a pairing table is created and stored for later retrieval. Thus each device having a network address in at least one network, wherein the digital data memory of the back up storage device includes digital data representative of a pairing table including at least a device identification and the device network address of each device in the network.

The pairing table includes at least, a device Identification (manufacturer name and model identifier) and its network address (e.g. Medium Access Control (MAC) address and network identifier (e.g. PANED)) so that the device can be communicated with on at least one network or from device to device if they are the only devices communicating. More information about device IDs and networks will be described later in the specification. In one embodiment all controllers and devices will belong to a common PAN. In another embodiment all controllers will belong to a common PAN whereas devices may belong to a different PAN to controllers and all devices need not belong to the same PAN. More about network configuration will be described later in the specification.

An alternative arrangement is for the non-NFC communications network to be used to initially collect/up-date/restore to and from the back-up device, in one of a number of ways, including polling, broadcast, etc. but most likely in a polling mode, to receive and store multiple keys in a LUT and pairing table inputs into a suitable backup table. There will also be some device to device communications that will exclusively use NFC.

An example of NFC to NFC communication between a controller or a device and another device is the use of say a keypad which works with the controller or device to allow for a different user input than provided on the controller or device. Such an arrangement could include a keyboard housing which is physically adapted to be located within NFC communication distance from the controller or device and paired to allow communication exchange using an NFC communication protocol. The process of coupling the controller or device or another device allows respective apparatus to exchange data and since the distance of separation is constant and typically very close the data rate of the exchange can be maximized for applications requiring such a characteristic.

The function of retrieving a key and/or a pairing table for a controller or device should preferably be in a controlled and secure manner, and there are many ways that can be achieved known those skilled in the art.

There will be many reasons why the relevant controller is no longer functioning/lost/lost and need its own stored code and or pairing table restored/replaced onto a replacement of newer model remote control or device.

In the case of a replacement controller it will need to be programmed to permit control of one or more controllable devices or receive information from one or more devices, in which case, instead of re-touching all the relevant devices, it can be touched once with the key and pairing table storage device to initiate reception of the relevant keys, pairing table/s and permissions (which can also be stored for such a need). The process of course should not be operable without appropriate checks and balances to ensure that such an operation is appropriate and in some cases authorized. Similar operations and considerations are relevant to dealing with devices which need to be updated/restored/replaced.

In one example, the device having the back-up key storage function can be pre-programmed to release keys, pairing table/s and other data (related or not) that is stored in the device, under certain conditions. It may be that user operable code or state/mode control switches are available to the user. It may be that the user needs to make an enquiry to a remote office and having proven their identity and need, that user will be provided a backup release key or state/mode control instruction.

Thus operation of the backup facility will allow restoration of the controller or device functionality related to the invention without the need to re-touch all the relevant devices/controllers.

A similar arrangement could be used to master reset and reprogram a controller or device, so that re-touch or re-programming can take place to revive operation of the controller or device, or to initiate reprogramming or firmware or software updates to the controller or device.

Figure 3A:
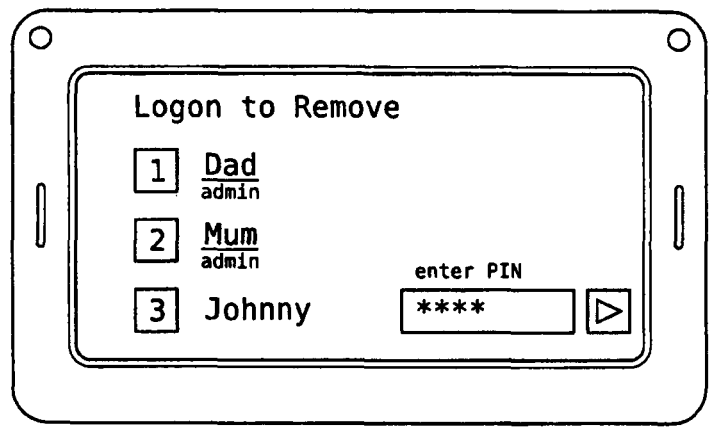
FIGS. 3A and 3B show how a controller can be set up for multiple user functionality.
Figure 3B:
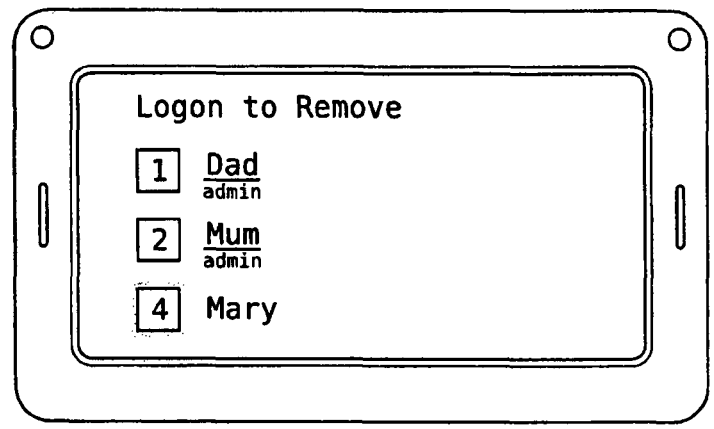

FIGS. 3A and 3B show how a controller is set up for a multi-user functionality. The ability to restrict a controller to a single user or limited number of users or specific users is also an advantage where a controller may contain personalized data such as phone book, music and video files, security access codes, etc. for each user. To achieve this, the identity of a controller user would need to be known where it would not be desirable for the controller to be operational and accessible by a wider user base which would be any other user. By way of example, a Personal Identification Number (PIN) is required in order to login to each of the specific user DAD or MUM accounts, and a PIN is not required for the son JOHNNY and daughter MARY accounts. This arrangement is useful when certain accounts are very privileged and those privileged functions are not suitable for all users to have access to.

The identity of a user may be verified using one or more of a number of mechanisms including, camera picture of video recognition, finger print scan, voice recognition, physical possession of the controller, or a PIN system. It is therefore possible for a single controller to have a single user authority, thereby allowing that user to restrict control functions to none, one or more specific other users or all other users. Additionally it is possible for a controller to be accessed by a number of users, but have its function and access controls determined by the identity of those users actually using the controller. All the data which represents the above types of restrictions are stored in a portion of the digital data memory of the controller as predetermined data and is used by the processor to invoke predetermined manners of operation of the controller, using programming language executed by the processor in ways known to those skilled in the art.

In an embodiment a user interface associated with the controller is operable by a user of the controller device to input data, and a portion of the digital data memory in the controller includes data usable by the processor of the controller device to determine from the user input data whether there is a match of the user input data with predetermined data within the memory, and where there is a match to allow the user to use the controller in a predetermined manner.

The predetermined data may be a PIN, or data representative of face recognition, finger print scan, and or voice recognition. Any one or more of the data can be used to match with the data input by the user.

The predetermined manner may include operating the controller in one or more modes to control one or more devices, making administrative changes to the controller or a device relating to access control privileges for whom and for what they can and cannot access, when (as the period of use, the begin and end time of use), where, etc.

In the controller there is a portion of the memory which includes data usable by the processor of the controller device wherein if the controller device does not have a match for the user input data the controller may allow a user of the device to use the controller device as a default user in a predetermined manner. For example, the default user privileges allow the television to be turned on to limited channels, to operate lights in certain rooms and to lock and unlock doors, but no other functions or interactions with devices in the home environment.

Figure 5A:
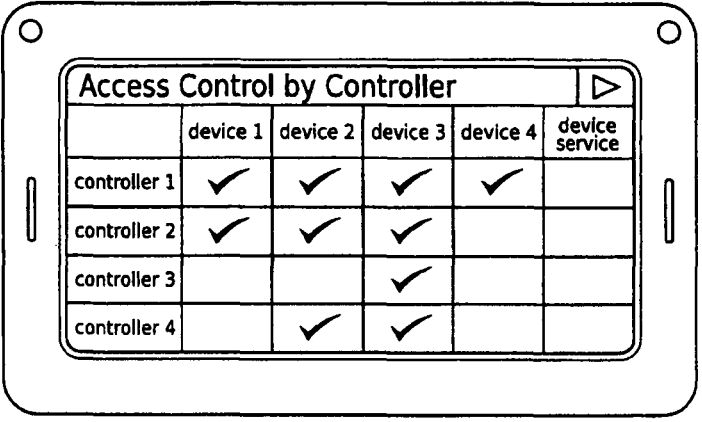
FIG. 5 illustrates how different users have access rights to control various controllable devices and services.
Figure 5B:
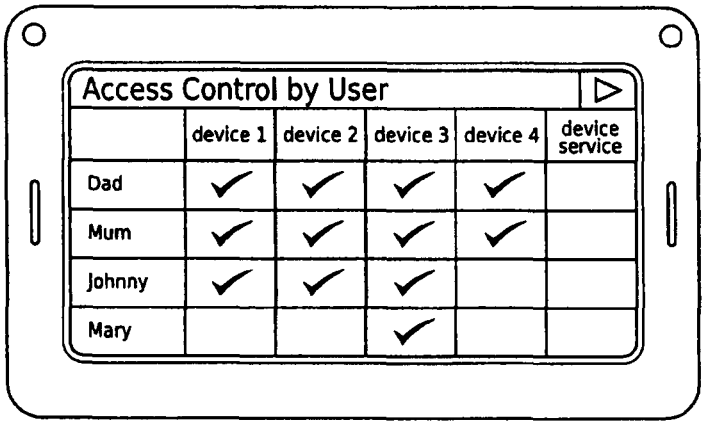

FIGS. 5A and 5B show examples of how access controls could be organized by controller (5A) and by user (5B). For each user, a set of privileges or access controls are listed and the access rights defined for each case (the converse being that there are restrictions thus imposed on certain users). Access/restriction controls may be assigned at the device level (as shown in FIG. 5A) or alternatively at a function level if finer grained access controls are required (as shown in FIG. 5B). In this example the DAD and MUM users have access to all 4 devices. The JOHNNY user can only gain access to devices 1-3 and the MARY user has access only to device 3. Note that a device could be a home entertainment device such as a DVD player, television, the Internet access capability of the same television, and it could be, an access door, lights, air-conditioner, lights, General Purpose Outlet (GPO) (mains power outlet), light control module, etc. The device service column illustrates that there could be a specific service available to users but all of the users are restricted to access that particular service, for example the service may be a particular software program for the administrative level access to the home control computer.

This system also allows, in an embodiment, a user to setup the access rights/privileges on a device and then transfer those right/privileges to the controller through bringing the controller into near field proximity to the device.

Where predetermined restrictions are stored in the digital data memory those restrictions may restrict access of the controller to the function of none, one or more functions of an accessible device. That is there can be cases where that controller has no restrictions on its use with one device but there are one or more restrictions with another device or devices.

It may also beneficial for a system to support the ability to grant user privileges outside the process of manually setting up a set of access controls using an administrator or table entry style of system. That is, the system can support Public or Guest access. One example of this type of application is when the system is being used in a hotel for providing guests with access to room facilities and hotel facilities and clearly each guest will want or be automatically provided a variety of those facilities and not all guests will be the same.

Several classes of Guest can be considered when assigning access controls.
1. A user that has not previously been associated with the access point.
2. A user that is not required to provide identifying data
3. A user that is required to provide identifying data.

1: In this case the association is a first time event so there is no historical access privileges assigned. This user may then be restricted to having no access, or granted limited access privileges. The user may also be provided special first time access privileges. For example to promote certain products, features or services that may be subsequently accessed by the user once qualifying criteria are established. Such criteria could be paying an extra fee, a subscription, entering secret codes or a PIN, answering questions, or any other requirement or physical means.

2: In this case the user may or may not have been associated previously. This type of user has access without the need to enter further identifying data such as a PIN, bio-signature, etc. This can provide the ability for users to simply and automatically gain access to Guest privileges, such as the one time access of a visitor, a guest of a hotel guest, etc.

3: In this case the Guest is part of a privileged group of users that gain access to privileges by meeting qualifying conditions. For example, by entering a PIN or other data, bio-signature, etc, the user is identified and gains access to privileges associated with that group.

Additionally a connection PIN may be required for a device to associate and connect with a central system controlling arrangement such as a standalone device, referred to herein as a hub or access point, to prevent unsolicited users having free access to the system by simply touching their controller to the hub. The PIN may be stored in the appliance, or users may have their own PIN's that permit different levels of access.

An example of this might be if a household is hosting a party. The controllers associated with the family members of the household may already have access controls set for their day to day use, such as Internet connection, environment controls, security systems, appliance controls, etc. However it may be desirable for guests to have access to a music system or juke box in order to browse and select music titles using their own controller (one provided to them or one brought with them from their own home), which may in fact be a suitably equipped personal mobile phone of the user/s.

In such a case those guests can touch a hub or access point and gain limited access to a pre-determined set of appliances or services within the home, and it will be apparent that a similar arrangement can be used or adapted to a hotel/motel environment.

This access point could be a security panel at a room entrance, a tablet format computer device that may be located at a convenient location, or some other device such as an appliance. In this example the appliance could even be the juke box or any other controllable device.

For device granted access controls to be implemented, the device detects the proximity of a user's controller and either:
1. Communicates with the access point/hub (for example a RADIUS server) to confirm the access rights for that user or controller, or
2. Invokes a set of default access controls determined by the device design and which may be determined by the manufacturer of the device and/or the system.

The latter of the above two options allows, in one example, the designer and manufacturer of the device to define access rights to various features or services to all users or even guest users that can be pre-determined at the time of manufacture or later up-loaded by any suitable means.

Access rights may also be time limited across the range of remote controllers. An example of time limited access might be where an event might be scheduled to finish at a set time. It may be desirable to ensure the access controls are terminated at that time. Another example is the limiting of access to a room or cabinet between predetermined times, such as in a private home and the bedrooms are made not accessible, or in a commercial building/hotel/teaching institution/etc. where access to one or more rooms is to be restricted or allowed as the event requires.

Internet accessible controls are desirable to allow remote control of device, services or access privileges even though the relevant user is remote from the home or hotel and the controllable device environment or receipt of information from devices that are not controllable but are designed to make data/information available, such as an outside temperature gauge, alarm system state reporter, etc. This feature is readily arranged using software and method known to those skilled in the art.

Another application for this technology is to include a controller or device module in a kiosk, which would otherwise interact with users using the interface provided by the kiosk (typically a touch screen), but will with the described technology allow for controllers or devices (which could include a cellular phone brought into the required proximity) to create a data exchange with the kiosk. An interface that maximizes the controller or device interface between the new user and the kiosk can include functions that may not be available to the kiosk and its interface, or allow exchange of data (opt-in or authorized by the user), such as for example the provision of a file from the kiosk to the new user to be referenced at the users leisure, or the provision of a Universal Resource Locator (URL) from the kiosk to the users device, or for the kiosk to receive information from the user, such as for example, their name and address, their age, etc so that the kiosk can tailor the supplied information provided to the user. A smart sign is but one example of a form of Kiosk.

For example access may be granted to a user entering a facility by having the user touch an access point with a controller thereby initiating the ability of the controller to interact with the appliances in the environment, but on leaving, a remote party can disable these access privileges using commands over the Internet or after a predetermined time access is negated. A further example is the remote unlatching of a controllable access point, such as a gate, to allow a trusted person to pass through the gate, even though the control of that latch is performed remotely. There are many variations of the types of functionality that can be implemented limited only by the imagination of the user and designers of the system.

PAN Formation:

In an arrangement of multiple controllers and devices, it is desirable to be able to manage wireless networks created by the pairing of controller/s with device/s such as PAN networks in a simple manner without the need for a coordinator or intermediary PAN management device.

In this way, the controllers themselves are all that is needed to form and manage one or more PAN's which may include one or more controllable devices and one or more devices.

By using the proximity touch mechanism described in detail in the specifications incorporated by reference, a controller can also be used to simplify the management of a PAN.

The initial state of a system is one where there does not exist any association between controllers and one or more devices and no PAN has been established.

To enable controllers to communicate with devices, a PAN can be formed. In one example, this process is initiated by bringing a controller into proximity with a device. The proximity sensors within each of the controller and device detect this and automatically communicate data to establish a PAN which includes at least that controller and that device.

One method used to form a MAC layer PAN is as follows:
1. When the controller is configured for the first time (out of the box) it scans all the RF channels associated with its PAN technology in order to determine the quietest channel.
2. Once the quietest channel is found, the controller randomly chooses a PANID (some of the possible PANIDs may be reserved for specific purposes and not used for general PAN establishment) and listens to traffic on that channel (for a specified period) for any packets with that PANID. If a packet with that PANID is detected the controller chooses a new random PANID and listens again.
3. Once an unused PANID is found, the controller chooses it to be its working PANID.
4. The controller and device are brought into proximity Radio Frequency (RF) communications range (generally 5 cm or less but this is not limiting and depends on the NFC arrangement used).
5. The controller and device establish a proximity RF communications link over which data communications can occur.
6. The controller communicates to the device over the proximity RF communications link and sends the following information: PSK (Pre Shared Key), IFT (Inter-Face Type), PAN address, PANID and RF channel. Where PSK is a randomly generated number to be used as the link encryption key, IFT specifies which PAN technology the controller wants to create the PAN on (e.g. 802.15.4, Bluetooth, Wi-Fi etc).
7. The device communicates back to the controller over the proximity RF communications link and sends the following information about itself: PS, MA, MO, CA, IFT, PAN address, PANID and RF channel. Where PS (Pairing Status) describes the state of the pairing association between the device and the controller, MA is the manufacturer's name, MO is the device's model number, CA (category) specifies the category or family the device belongs to, IFT specifies all the PAN network interfaces the device supports. If the IFT specified by the controller is among them, then the fields PAN address, PANID and RF channel apply to that interface.
8. If the device supports the controller's PAN technology it creates a provisional pairing entry in a pairing table for the controller, the controller creates a provisional pairing table entry for the device and the controller informs the user that the device is in proximity and optionally displays its information for confirmation.
    a. Depending on the pairing status between the controller and device, the user is presented with one or more actions they can perform including: pair, unpair, end proximity session, factory reset and other device specific actions.
    b. If the user chooses the pair action, both the controller and the device make their PAN association permanent (non-transient). Bidirectional communication is now possible over a point to point PAN link that is secured by the previously exchanged PSK.
9. If the device does not support the controller's PAN technology, the controller will examine the IFT returned by the device and determine the most appropriate interface they have in common (if one exists) and then steps 6 . . . 8 are repeated.
10. Steps 4 . . . 10 are repeated for each device that is to be added to the controller's PAN.

A controller is able to command a device that it is paired with to change its PANID and/or RF channel at any time.

In short, controllers form PAN's under user control. Additionally, the user creating the new PAN can associate a user PIN or passphrase or the like with the network in order to form a secure PAN.

It is advantageous to have the ability to create multiple PAN's as it provides a means of grouping and managing related devices and for treating devices differently that must be kept secure and separate operationally from other devices. Additionally a number of devices may have communications channels on different frequencies. It is common that devices use 900 MHz, 2.4 GHz and 5 GHz for wireless communications and as such, grouping these by frequency using multiple PAN's, can simplify network management by suitably equipped controllers as well as allow frequency management if required.

Figure 2:
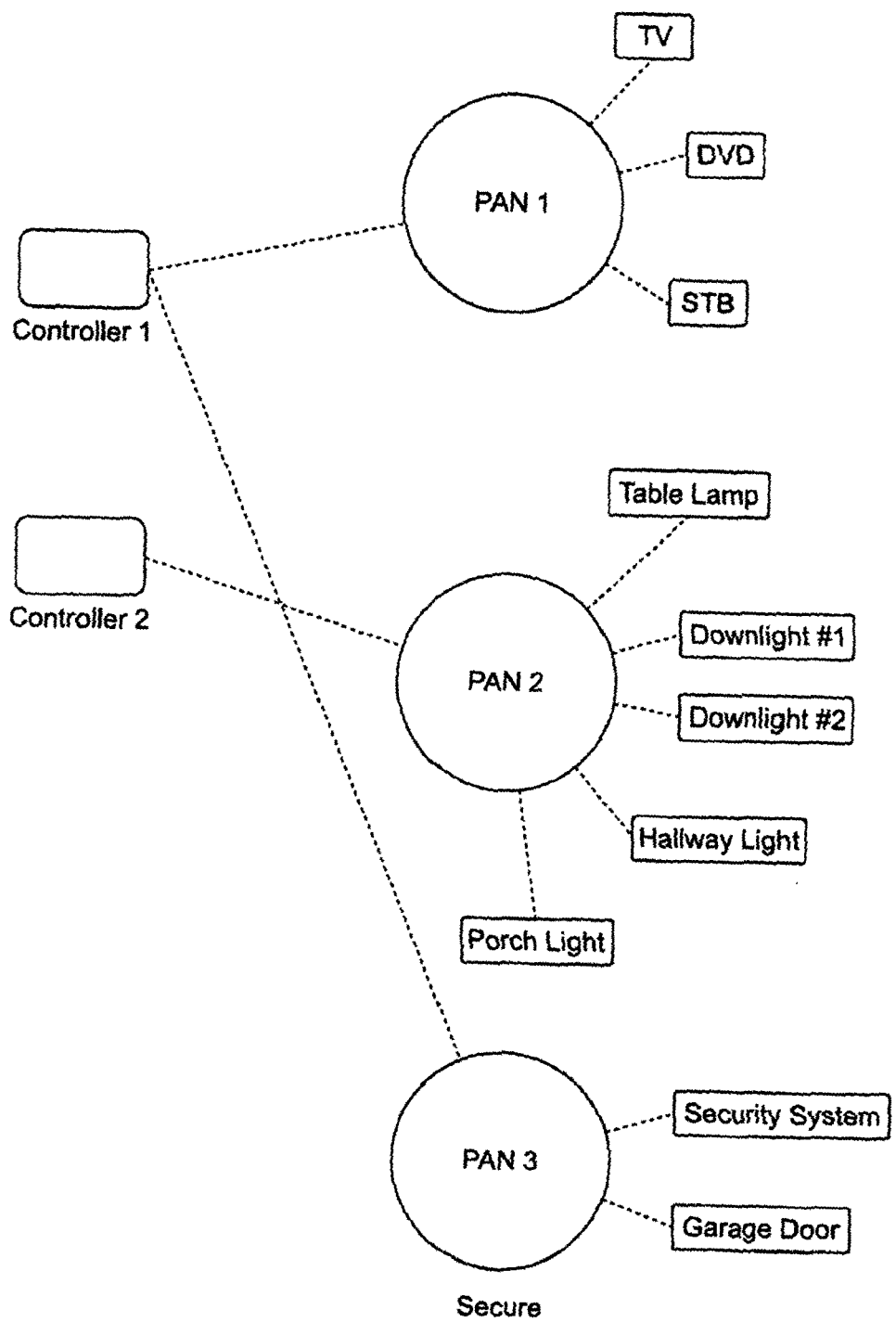
FIG. 2 represents a system showing how several wireless networks can be used to allow users to interact with controllers, devices and controllable devices.

FIG. 2 shows how this arrangement can be used.

In this example:

PAN 1 operates a 2.4 GHz network and assigned to the audio/video (AV) equipment in the lounge room.

PAN 2 operates a 900 MHz network for the lights in the home.

PAN 3 operates a 2.4 GHz network containing the home security system and garage door controls of the home.

In this example, the XGHz or ZMHz network reference is a shorthand reference to one or more known standards for communication such as "IEEE 802.15.4 (YYYY version)" protocols operating within the standardized frequency range and having standardized channels within that range.

Controller 1 is authorized access to devices on all three PANs (PAN1, PAN2, and PAN3) networks and would typically be used by a parent of the household or system administrator in a commercial environment.

Controller 2 has been authorized to access only devices in PAN 1 and is typically used as an unrestricted family, guest or children's remote. It does not have the ability to control or even communicate with the devices contained within PAN 2 or PAN 3.

Controller 3 is dedicated to PAN 2 as its function is dedicated to the hall light switch for convenient night access to a child's bedroom or bathroom.

Group Formation:

Another method of grouping devices for the purpose of device management or access controls is through the use of Groups.

One method by which groups can be defined is allowing a subset of functionally for similar devices to be controlled as a collective. Single devices within that group can also be controlled separately from that group.

Figure 4:
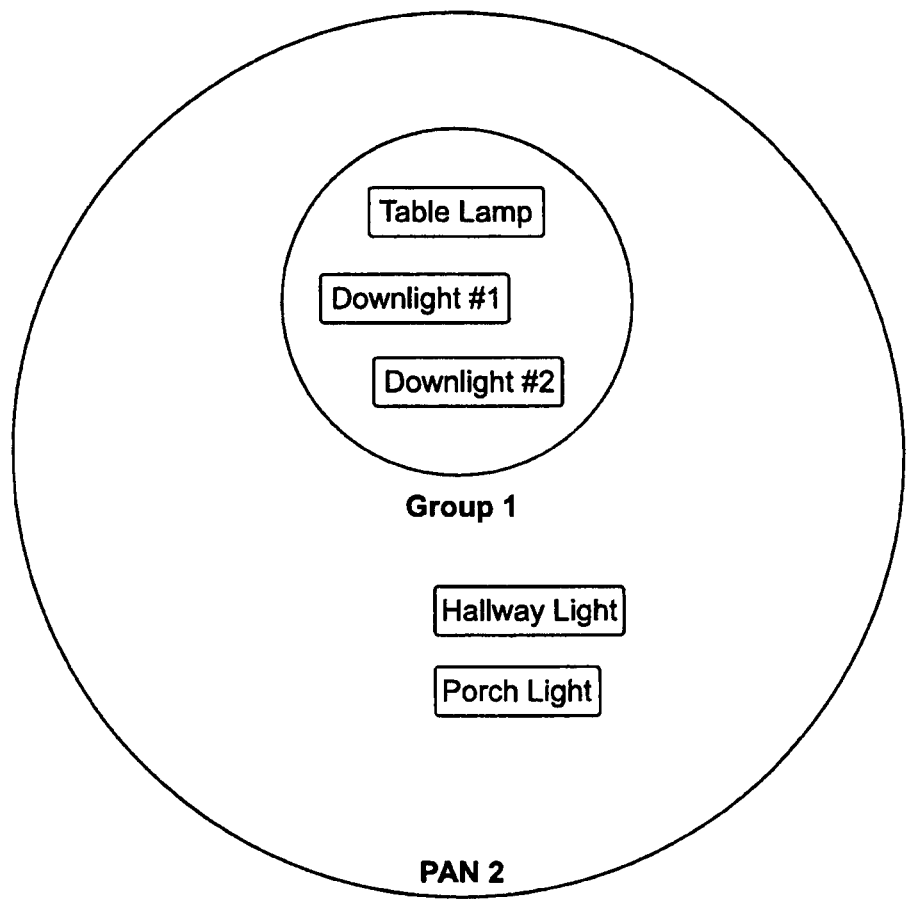
FIG. 4 represents a system showing how several groups of devices can be used to allow users to interact with controllers and controllable devices.

An example of this type of grouping is where a controller is paired with a set of 5 lights all within PAN2 as illustrated in FIG. 4.

| Device Nickname | Group ID | | Purpose |
|---|---|---|---|
| Table-lamp | G1 | ⎫ | |
| Downlight-1 | G1 | ⎬ | Control all kitchen lights as one |
| Downlight-2 | G1 | ⎭ | |
| Hallway-light | G2 | ⎤ | Turn on the porch and hallway lights together |
| Porch-light | G2 | ⎦ | |

An attribute or Group ID can be associated with each light to indicate that it is grouped.

The G1 group can be assigned to each device and given a nickname such as Kitchen Lights By selecting the Kitchen Lights group (via an on-screen icon), the 3 lights in G1 can be controlled in unison, for example they may be turned ON and OFF or dimmed together. Also by controlling the individual device Downlight-1 it can be turned ON and OFF or dimmed separately from the group.

Advantageously in a multi controller environment, any of the controllers can be used to control the lights. If one controller is used to dim a light, then state changes caused by one controller may be wirelessly communicated to all other controllers within range allowing the true state of the light to be reflected on those controllers in real time.

When a controller is out of wireless range of its devices, it has no mechanism to receive device state changes. In this case such a controller will request the states of its devices when it has determined that communications with them is again possible.

This is a significant advancement over current wired dimmers where, despite the fact that a number of light switches may be distributed throughout a building using 2 way or 3 way (or more) switch circuits, only a single master dimmer can be fitted to one of these switches.

A similar group of items can be applicable to General Purpose Outlets (G.P.O.s) e.g. mains power points; motor controllers; heater banks; etc. It is envisaged that when a G.P.O. is a controllable device then any appliance, such as for example, a table lamp, a DVD, a coffee maker, etc, power by that power point is then able to be remotely switched ON and OFF by controlling the flow of mains power to that appliance.

In one embodiment it is possible to create one or more groups of controller and devices by placing the controller into a predetermined manner, mode or operation and using the touch technique with each device or controller that is to be part of the group, such groups can be, ad hoc and others may become long term existence groups. When each pairing is made the pairing information is added to the relevant LUT and pairing table.

The control of mains or other power (could be Direct Current powered) to an appliance can be achieved by adapting or replacing any appliance switch (in the actual appliance, in-line with the appliance, or the wall switch remote from the appliance (for one or more ceiling lights for example)) with a controllable device module.

Several embodiments allowing lights to be associated with a controller are discussed:

Light Bulb Adaptor Module:

In this embodiment, a device within an adaptor housing is placed into an existing light bulb fitting. The adaptor housing may also have an equivalent light socket built in, allowing the original bulb to be inserted. Alternatively the adaptor housing may contain its own light emitting arrangement which may be a LED replacement light.

Additionally, three colour LED's could be fitted to these lights, as to allow a controller to also change the colour of the illumination.

An example of the use of the system described herein might be where it is beneficial to alter the mood of an environment or using colour changes for entertainment or staging effects. The colour of the lights could even be linked to events or other sensors.

Such a light controller adaptor will contain all the necessary circuits to allow wireless communications with a controller, be part of a PAN, proximity sensors, and other communications mechanisms and the necessary circuits to switch and optionally dim the light.

In-Line Controller Module:

In this embodiment, a module is in-line wired into the wiring supplying the existing light circuit. The device may also have a manual override switch and may even replace or add to an existing light switch behind the switch plate.

Additionally the module may contain all the necessary circuits to allow radio communications with a controller, proximity sensors, communications mechanisms and the necessary circuits to switch and optionally dim the light circuit.

Transition State:

In a system that contains multiple controllers when the state of a device is changed by one controller, all other controllers should have that state updated in order for them to represent the true state of the system.

When a delay exists between the control command being sent to the device and the actual state being reached by that device this state change in transition is not indicated by any controller, even though it might be important to know that, thus current arrangements do not provide any transitional information.

An example of these situations is when a user sets the desired temperature of a thermostatically controlled air conditioner. A significant time lag may exist before the room temperature actually reaches the desired temperature, if at all.

Another example is where a roller blind for a window has been sent a command to open. It may take several seconds for the open position to be reached.

These transition periods where an appliance has been directed to change state and the time when the appliance has not reached its final or commanded state is defined as a transitional state.

Arguably, all devices have a finite transitional state time when they change from one state to another. That is, the time between when the command was sent by the controller and the device reaching the final stage of the state change where the finished state is different to the initial state of the device. However in many cases, such as changing the channel on a television set, the state change time is so small as to be imperceptible to a user and therefore appears to be instantaneous. The logic involved in implementing any control system can be implemented using software and hardware and thus it is possible to detect and report state change at one or more stages of the transition.

FIG. 6 shows a case where the transition time is perceptible, it is an advantage to alert the users that the device has not reached its final state or steady state condition. This transitional state can be represented by in one example, a change in the device icon appearance or by a message and preferably should be represented on all controllers that are associated with the device. This is particularly, helpful to a user of a garage door opening or closing function.

FIG. 6 shows an example of a controllable device in several states. In this example, the device is a curtain and can be controlled to be either in the open or closed position. The control is represented as a switch graphic. By touching the graphic, the curtain is commanded to open or close. A status indicator is also shown. Additional indicators such as wireless network signal strength, etc may also be shown.

Concept 1: Device in Initial State.

Figure 6A:
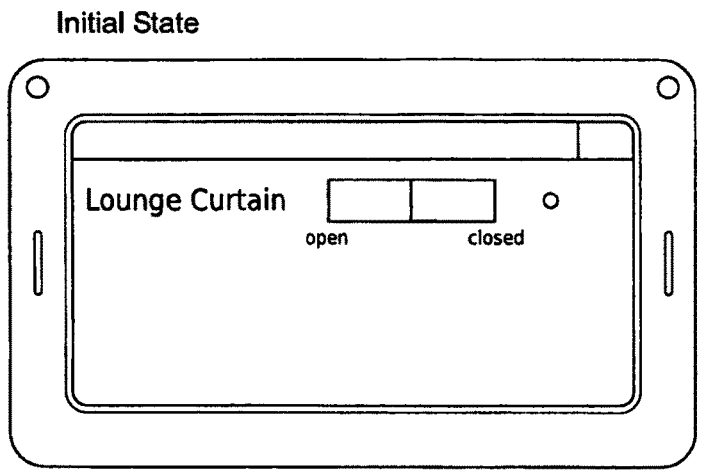
FIG. 6A illustrates how the state of a controllable and other devices can be represented on a controller when in an initial state.

FIG. 6A illustrates how the state of controllable and other devices can be represented on a controller when in an initial state. Note that some or all of the illustrated elements are images on a screen in which case the screen is a touch sensitive screen and the switch for example can be manipulated. The light in such a case is one or more elements of the screen programmed to become brighter or alternate in brightness to indicate a flashing action. Such a screen will allow the display of a large variety of text and icons one or more of which can be manipulated. Such a screen will allow the display of text and icons that suit the mode or application at the relevant time most useful to the user of the device or controller.

In this example the curtain switch is in the closed position and the indicator (located adjacent to the switch) is not illuminated. This indicates that the curtain is in the steady state closed state with no errors.

Concept 2: Device in Transition State.

Figure 6B:
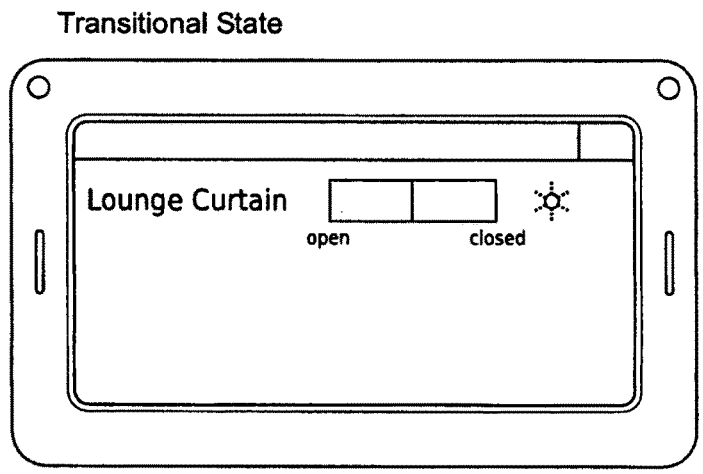
FIG. 6B illustrates how the state of a controllable and other devices can be represented on a controller when in a transition state.

FIG. 6B illustrates how the state of a controllable can be represented on a controller when in a transition state.

In this example the curtain has been commanded to open by manipulation of the relevant switch. The curtain switch is shown in the open position and the indicator is flashing. This indicates that the curtain has not yet reached the final open position, but is in a transition state. That is, it has moved away from the closed state and is in the process of opening.

Concept 3: Device in Final State.

Figure 6C:
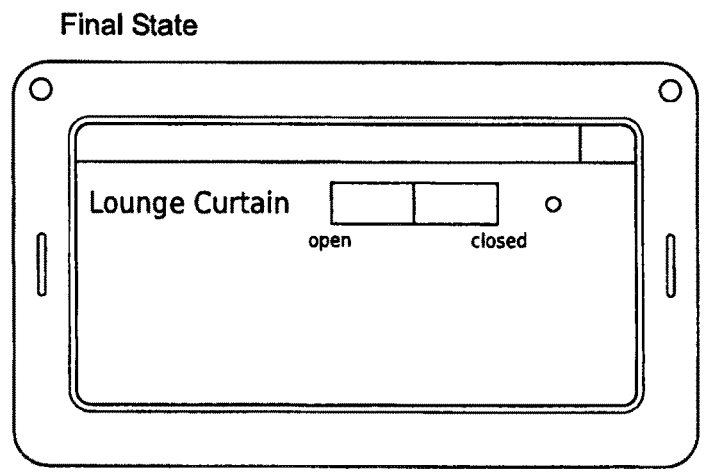
FIG. 6C illustrates how the state of a controllable and other devices can be represented on a controller when in a final state.

FIG. 6C illustrates how the state of controllable and other devices can be represented on a controller when in a final state.

In this example the curtain has been commanded to open. The curtain switch is in the open position and the indicator is not illuminated. This indicates that the curtain has reached the final open position with no errors.

Concept 4: Device Error.

Figure 6D:
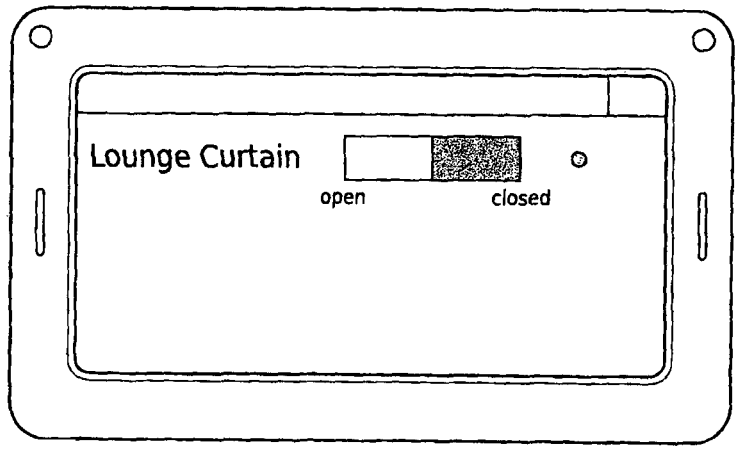
FIG. 6D illustrates how the state of a controllable device and other devices can be represented on a controller when in a failed state.

FIG. 6D illustrates how the state of a controllable device and other devices can be represented on a controller when in a failed state.

In this example the curtain has been commanded to open, but the indicator has turned red showing en error has occurred. For example the curtain might be stuck in a mid position and a timeout or some other error has occurred.

Concept 5: Device Cannot be Controlled.

Figure 6E:
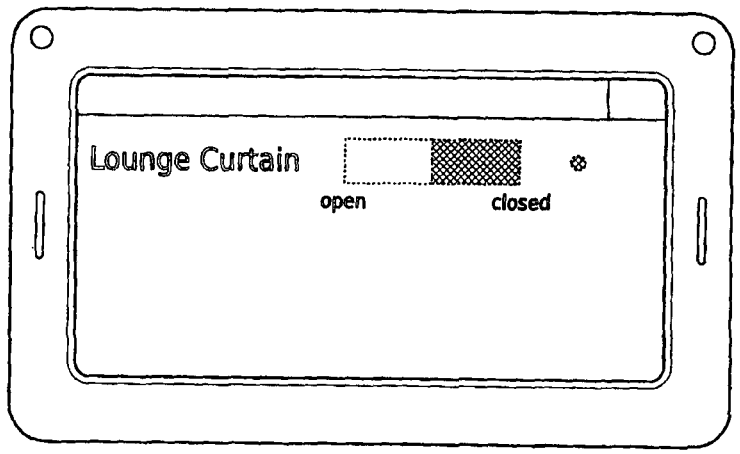
FIG. 6E illustrates how the state of a controllable device and other devices can be represented on a controller when in a non-operable state.

FIG. 6E illustrates how the state of a controllable device and other devices can be represented on a controller when in a non-operable state.

In this example the curtain is unable to be controlled. The graphics are grayed out showing that user input is not possible. This may be caused by a power failure to the curtain power supply; the wireless network is out of range; etc.

Concept 6: Multi Controller Updates.

Figure 7:
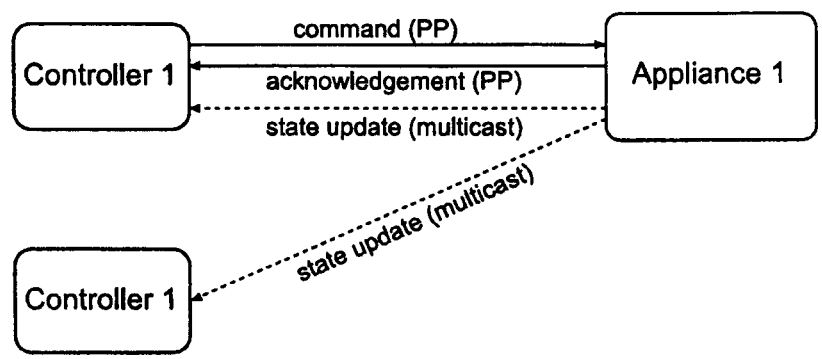
FIG. 7 illustrates how the state of an appliance can be communicated to a group of controllers.

FIG. 7 illustrates how the state of an appliance can be communicated to a group of controllers. A number of controllers may exist that can control a device. One controller commands the device and the device acknowledges to the commanding controller that the command has been received and subsequently sends a state update to all controllers to indicate the new state has been achieved.

The logic involved in implementing any control system can be implemented using software and hardware and the methods of doing so will be well known to those skilled in the art.

"Logic," as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programs are logic device. Logic may also be fully embodied as software.

"Software," as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skilled in the art that the form of software is dependent on, for example, requirements of a desired application, the environment it runs on, and/or the desires of a designer/programmer or the like.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

The invention claimed is:

1. A system of multiple controllers for controlling and monitoring one or more devices, wherein each controller comprises a processor, a controller digital data memory, a visual display, at least one or more wireless communication mechanisms, and each device comprises, a processor, a device digital data memory for storing digital data representative of at least one state of the device, at least one or more respective wireless communication mechanisms, the system comprising:
each controller and at least one device, which is not controllable by the controller and unknown to any of the controllers, each configured to use near field communication to associate each other, when each controller is in near-field proximity of said at least one device, wherein the at least one device is not controllable or known by any one of the controllers until the at least one device becomes associated with one of the controllers when one of the controllers is in near field proximity of the at least one device;
the associated each controller and the at least one device configured to exchange information to create a wireless network, wherein the wireless network comprises multiple controllers and the one or more devices;
the associated each controller receiving from the at least one device data representative of the functionality of the device such that the controller receives information from the at least one device to enable the controller to control the device;
the each controller is configured to receive at least one state; and
the each controller processor and the each controller digital data memory are adapted to indicate at least one state of the respective device on the visual display of each respective controller.

2. The system of claim 1 configured:
for the each controller to have a controller identifier;
for the each device to have a device identifier; and
the respective device digital data memory configured to store a pairing table, the pairing table being for containing the respective controller identifier and respective device identifier for the paired controller and the paired device.

3. The system of claim 1 configured:
for the each controller to have a controller network address within at least one wireless network;
for the each device to have a device network address within at least the one wireless network; and
the respective device digital data memory configured to store a pairing table, the pairing table being for containing the respective controller network address and respective device network address for the paired controller and the paired device.

4. The system of claim 1 wherein: the controller digital data memory is configured, for a portion thereof to include digital data usable by the controller processor to restrict access of the controller to none, one or more devices.

5. The system of claim 1 wherein: configured for one or more devices to be grouped and for a respective controller to control the predetermined one or more devices in one group.

6. The system according to claim 5 configured for a controller to control devices in one or more groups.

7. The system of claim 1 configured for:
the controller to have a user identity mechanism for determining the identity of a user of the controller for the identified user to determine the function and access controls of the controller usable by the identified user.

8. The system of claim 7 configured for the devices or groups of devices controllable by the controller to be predetermined according to the identified user of the controller.

9. The system of claim 8 configured for the data displayed on the visual display to be predetermined according to the identified user of the controller.

10. The system of claim 1 configured for the digital data representative of the state of a device to include data representative of at least one state of a group of states: an initial state, a final state, a transition state between an initial state and a final state, and a non-controllable state.

11. The system of claim 1 wherein when a portion of the device digital data memory including digital data representative of the state of the device changes, indicating a changed state of the device, the digital data representative of the changed state is usable by the processor to communicate using the wireless communication mechanism, the changed state of the device to the each respective controller.

12. A method of controlling and monitoring one or more devices using multiple controllers, wherein each controller comprises, a processor for processing digital data, a controller digital data memory, a visual display, one or more wireless communication mechanisms, and each device comprises, a processor for processing digital data, a device digital data memory, a portion of the device digital data memory to include digital data representative of the state of the device and usable by the processor to communicate, using a respective one or more wireless communication mechanism, the state of a device to the each controller, the method characterized by:
initiating near field communication from one controller to a device in field communication proximity, the device not controllable or known by any one of the controllers until the device becomes associated with the one controller when the one controller is in near field proximity of the device;
exchanging information using the near field communication mechanism to create at least one wireless network having multiple controllers and one or more devices;
receiving at the controller from the at least one device data representative of the functionality of the device such that the controller receives information from the at least one device to enable the controller to control the device;
receiving at the controller digital data representative of at least one state using the at least one wireless mechanism; and
adapting the controller digital data memory using the controller processor to indicate at least one state of a respective device on the visual display of the respective controller.

13. The method of claim 12 wherein the one or more devices and the each controller having a respective identifier, the method further comprising:

creating a pairing table in the digital data memory of at least one controller which indicates a state of a respective device, wherein the pairing table contains at least one controller identifier, paired with a device identifier of each respective device as the paired controller; and receiving at the controller from each respective device using a wireless communication mechanism, digital data representative of the device identifier of each respective device.

14. The method of claim 12 further comprising: one or more devices and each controller having an address, the method including the further step:

creating a pairing table in the digital data memory of at least one controller which indicates a state of a respective device, the pairing table including at least an address of each controller paired with the address of each respective device as the paired controller; and receiving by the controller from each respective device using a wireless communication mechanism, digital data representative of the network address of each respective device.

15. The method of claim 13 including the further step:

initiating near field communication between the at least one device and the controller or between the at least one device and another device of the one or more devices in near field communication proximity, wherein the at least one device and the another device each have a pairing table;

exchanging digital data representative of the pairing table of each of the at least one device and the controller between the at least one device and the controller or digital data representative of the pairing table of each of the at least one device and the another device between the at least one device and the another device.

16. The method of claim 14 including the further step:

initiating near field communication between the at least one device and the controller or between the at least one device and another device of the one or more devices to another controller or device in near field communication proximity, wherein the at least one device and the another device each have a pairing table;

exchanging digital data representative of the pairing table of each of the at least one device and the controller between the at least one device and the controller or digital data representative of the pairing table of each of the at least one device and the another device between the at least one device and the another device.

17. The method of claim 12 wherein: the controller includes a user identity mechanism to determine the identity of a user of the controller, and the further step of:

receiving input from a user of the controller;

processing the received input using the user identity mechanism to identify the user wherein the identified user determines function and access controls of the controller usable by the identified user.

* * * * *